United States Patent [19]

Deerhake

[11] 3,763,351

[45] Oct. 2, 1973

[54] BAR CODE SCANNER

[75] Inventor: William James Deerhake, Raleigh, N.C.

[73] Assignee: International Business Machines Corporation, Armonk, N.Y.

[22] Filed: July 14, 1972

[21] Appl. No.: 271,961

[52] U.S. Cl. 235/61.11 E, 250/219 D, 340/174.1 A

[51] Int. Cl. .......................... G06k 7/10, G11b 27/10

[58] Field of Search .............. 235/61.11 E, 61.11 D, 235/61.11 R; 340/146.3 K, 146.3 AG, 174.1 A, 146.3 R; 250/219 D

[56] References Cited

UNITED STATES PATENTS

| | | | |
|---|---|---|---|
| 3,243,776 | 3/1966 | Abbott et al. | 340/146.3 R |
| 3,502,850 | 3/1970 | Lindquist et al. | 235/61.11 E |
| 3,708,748 | 1/1973 | Nassimbene | 235/61.11 R |

*Primary Examiner*—Thomas J. Sloyan
*Attorney*—John B. Frisone et al.

[57] ABSTRACT

A self-clocking bar code is scanned by a multiple element scanner which provides a continuous output indicative of the reflectivity of the area scanned. At discrete points determined by the information content of the bar code the output of the scanner is sampled and decoded.

5 Claims, 11 Drawing Figures

BAR CODE SCANNER

BACKGROUND OF THE INVENTION

1. Field of the Invention

The invention relates to a scanning mechanism for scanning bar-coded data and more particularly to multiple element bar code scanning mechanisms which are insensitive to velocity variations.

2. Description of the Prior Art

Several techniques for scanning bar-coded data have been utilized. In those instances where the coded data to be scanned includes clocking information the data may be scanned by hand-propelled scanning devices. Time measurements between discontinuities or transitions may be utilized for decoding purposes if velocity variations are held within certain limits. However, the uncertainties introduced by velocity variations are cumulative and impose greater tolerances on the data representations. Thus, the representations of the data must be printed, or otherwise applied to a support media, with a greater degree of accuracy to compensate for the accelerations or velocity variations.

Another technique has been proposed which eliminates acceleration or velocity variations. According to this technique the scanning mechanism comprises spaced detectors which provide a measurement of the coded data which is independent of scanning velocity. One of the detectors is utilized to detect transitions in the encoded data and the other spaced therefrom detects the reflective state of the encoded data at a fixed distance from the detected transition. While this technique is independent of acceleration, it is, however, susceptible to noise. The second detector examines a small or narrow area of the encoded data to make a decision and dirt or holidays may result in an erroneous decision. Furthermore, since the decision is based on the examination of a small area, a substantial quard band is required. This guard band imposes additional restrictions on the dimensional tolerances of the coded representations.

SUMMARY OF THE INVENTION

The invention contemplates a scanner suitable for the hand-propelled scanning of coded representations which include timing information and comprises a multielement scanning member in which at least one element is arranged to simultaneously examine an area coextensive with the largest coded representation and another element provides sampling signals for indicating when said first element is in a predetermined registration with the coded representations and circuit means responsive to the signals provided by said elements for categorizing the sizes of the successive coded representations.

One object of the invention is to provide a scanner suitable for hand-propelled scanning of coded representations.

Another object of the invention is to provide a scanner suitable for hand-propelled scanning of coded representations, which is insensitive to velocity variations.

A further object of the invention is to provide a scanner suitable for hand-propelled scanning of high density printed coded representations.

Still other objects, features and advantages of the invention will be apparent from the following more particular description of a preferred embodiment of the invention, as illustrated in the accompanying drawings.

DESCRIPTION OF THE PREFERRED EMBODIMENTS

Figure 1:
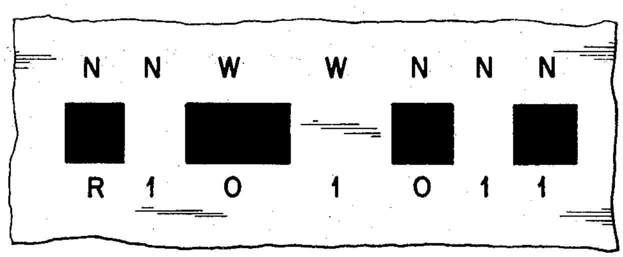
FIG. 1 is a representation of bar coded data suitable for use with the invention.

FIG. 1 is a graphical representation of bar coded data in which alternating areas of different reflectivity are arranged to encode data. The particular bar code illustrated in FIG. 1 encodes the binary character 101011 and is a combination of alternating areas of reflectivity of both narrow and wide areas as indicated in the figure. The narrow black area at the left of the bar coded representation is a reference mark which has as its primary functions to establish the beginning of the character representation and the width of the narrow mark which is used as a reference to determine the width of the subsequent space. If the first digit of the binary character encoded is a one, the space immediately following the reference mark will have the same distance or extent as the narrow reference mark. The second digit of the character is encoded by the second mark. In this instance, since the second digit is a zero the second mark is chosen to be wide so as to be distinguishable from the narrow space immediately preceding. The third digit of the character is a one which dictates the choice of a wide space so that the space used for encoding the digit will be identical in width to the preceding mark. The fourth digit of the character, being a zero, requires a different size, thus a narrow mark is selected. The remaining two characters being one continues in the same manner with a narrow space followed by a narrow mark.

The bar coding technique illustrated and described above is called retrospective or delta distance since the mark or space defining a particular digit of a character encoded is chosen with respect to the preceding space or mark respectively. Thus, if a one is to be encoded the space or mark used for encoding the one will have an extent or width equal to the extent or width of the preceding space or mark as the case may be. However, if the digit to be encoded is a zero, the mark or space for encoding the zero will differ from the preceding mark or space as the case may be. Thus, if the preceding mark or space is wide, the mark or space used to encode the zero must be narrow. Alternatively, if the preceding mark or space is narrow, the mark or space used for encoding the digit must be wide. The bar coding technique illustrated in FIG. 1 and described above is particularly suitable for hand scanning since the preceding mark or space for any digit is utilized as a reference for decoding the digit. Thus, accelerations and decelerations of the scanning mechanism are minimized within the bounds of human capability and dimensions employed. While the accelerations and decelerations are minimized, they nevertheless constitute a factor and are cumulative with the tolerances with which the marks and spaces are printed or otherwise placed on the media. If the accelerations and decelerations can be eliminated entirely, this permits a greater latitude in the printing tolerances which may be allowed since the errors introduced by the accelerations and decelerations are cumulative therewith.

Figure 2:
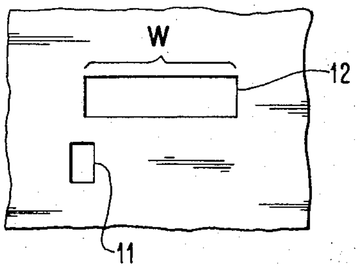
FIG. 2 is a schematic representation of scanning slits according to the invention.

In FIG. 2 a schematic representation of the scanning arrangement, according to the invention, is illustrated. Two slits, 11 and 12, are arranged so that the left most edge of slit 12 falls at the center of the slit 11. Thus, when slit 11 is viewing a half white and a half black area, a clocking signal is generated which at that time samples the area viewed by slit 12. If slit 12 extends the width of a wide space or bar, the energy transmitted through the slit will be between a pair of thresholds if the slit spans a narrow space or mark. If the slit spans a wide space, a maximum amount of energy above the upper threshold limit will be transmitted through the slit. Conversely, if the slit spans a mark, a minimum amount of energy that is below a lower threshold limit will be transmitted. It is obvious with this arrangment that accelerations have no effect on the energy transmitted at the instant when the slit 11 is halfway through a transitional area.

Figure 3:
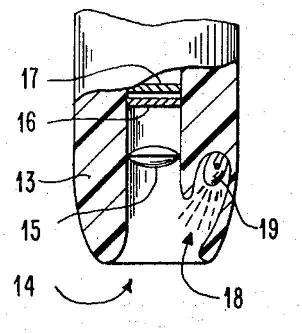
FIG. 3 is a schematic sectional view illustrating the construction of a novel scanner suitable for scanning the bar code illustrated in FIG. 1.

FIG. 3 is a sectional view of a complete scanning wand employing the slit structure illustrated schematically in FIG. 1. The wand is provided with a generally circular body portion 13 which has a central opening 14 therein. Mounted within the opening 14 is a lens system 15, a member 16 including the slits 11 and 12, and a photosensitive detector element 17 which includes two photosensitive elements in proximity to the slits 11 and 12 for responding to the light transmitted via the slits 11 and 12 in member 16. An opening 18 in the wall of body 13 permits light from a source 19 to illuminate the coded representations when the scanning member is in contact with the media supporting the coded representations. The light from source 19 is reflected by the media and absorbed by the marks comprising the coded representations. The reflected light from the media and the representations passes up through the lens system 15 via the slits 11 and 12 in member 16 and is detected by the photosensors on member 17.

Figure 4:
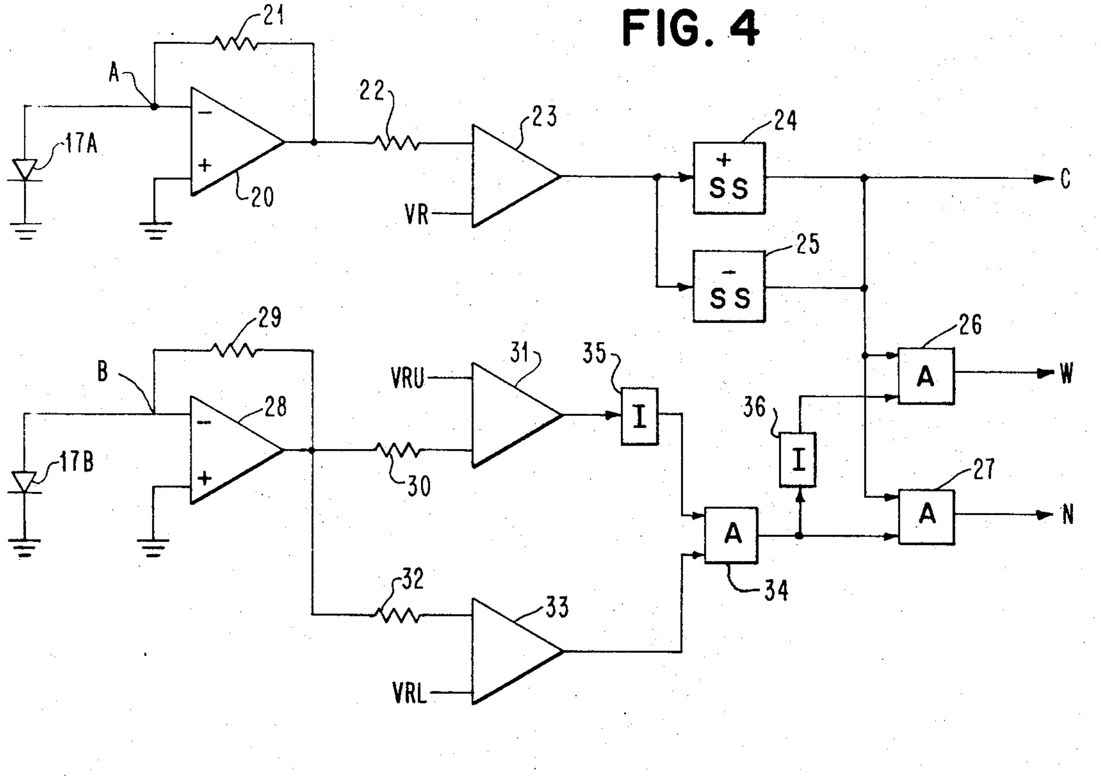
FIG. 4 is a schematic circuit diagram of a scanner constructed according to the invention.

In FIG. 4 the photosensor 17A in alignment with slit 11 is connected to one input of a grounded amplifier 20 which includes a feedback resistor 21. The output of amplifier 20 is connected by a resistor 22 to one input of another amplifier 23. The other input of amplifier 23 is connected to a voltage reference source $V_r$. When the output from amplifier 20 rises above $V_r$, amplifier 23 provides an output which causes a single shot circuit 24 to provide a pulse output. When the output from amplifier 23 falls, which occurs when the signal output from amplifier 20 falls below reference voltage $V_r$, a single shot circuit 25 connected to the output of amplifier 23 provides a pulse output. The pulse outputs from single shot circuits 24 and 25 are applied to sampling gates 26 and 27. With the circuit arrangements described, sampling pulses are generated at the outputs of single shot circuits 24 and 25 whenever amplifier 23 turns on or turns off This occurs as the input voltage to the amplifier from the output of amplifier 20 rises above the reference voltage $V_r$ or falls below the reference voltage $V_r$. The reference voltage $V_r$ is selected so that the output from amplifier 20 equals $V_r$ when the slit 11 views a half white and half dark portion of the coded representations. Thus, the condition occurs at the transitions, that is, as the slit crosses the edges of the nonreflective areas and the slit is midway at the transition. That is, the discontinuity or transition is at the center of the slit. As slit 11 passes along the coded indicia, a sampling pulse is provided by single shot circuits 24 and 25 each time the slit crosses a transition from white to black or black to white. It is at these times that the output provided by the photosensitive element 17B overlying slit 12 must be examined.

Photosensitive element 17B associated with slit 12 is connected to one input of a grounded amplifier 28 which is identical to amplifier 20 and also includes a feedback resistor 29. The output of amplifier 28 is connected by a resistor 30 to one input of another amplifier 31 which is connected to a reference voltage source $V_{ru}$. It is also connected by another resistor 32 to an amplifier 33 which is connected to a reference voltage source $V_{rl}$. When the output of amplifier 28 rises above reference voltage source $V_{ru}$, amplifier 31 provides an output. The same is true with respect to amplifier 33. Here the amplifier provides an output when the output of amplifier 28 rises above reference voltage source $V_{rl}$. Reference voltage source $V_{rl}$ is selected such that the amplifier 33 will provide an output when slit 12 views an area which is substantially two-thirds black and one-third white. Voltage reference source $V_{ru}$ is selected so that the amplifier 31 will provide an output when the slit 12 views an area which is substantially two-thirds white and one-third black. The output of amplifier 31 is connected to one input of an AND circuit 34 via an inverter 35 while the output of amplifier 33 is directly connected to the other input of AND circuit 34. AND circuit 34 provides a usable output when the signal level from the photosensitive element as modified by amplifier 28 falls between the two reference voltage levels $V_{rl}$ and $V_{ru}$. Between these levels the slit 12 is considered to reside on a half white/half black area.

The output from AND circuit 34 is connected to the other input of AND gate 27 and connected via an inverter circuit 36 to the other input of AND gate 26. Depending upon the condition of the output of AND circuit 34 at the sample time, as determined by the outputs of single shot circuits 24 and 25, AND gate 27 will signal that the slit at the sampling time is viewing a half white and half black area or a narrow area and AND gate 26 will signal that the slit 12 is viewing an all black or an all white area or a wide area if at the sample time the output of AND circuit 34 is at the usable or not-usable level respectively. The outputs C, W and N are used for decoding the representations as scanned.

Figure 5:
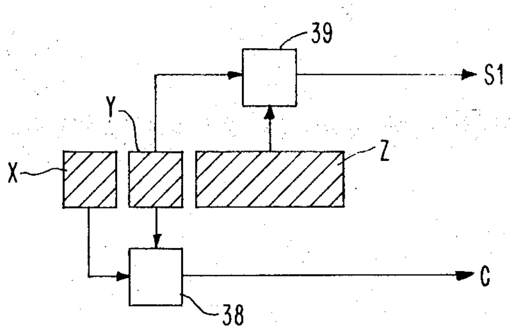
FIG. 5 is a schematic representation of another embodiment of the invention illustrated in FIG. 2.
Figure 6:
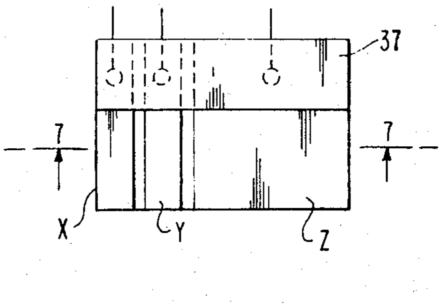
FIG. 6 is a plan view of the scanning elements illustrated schematically in FIG. 5.
Figure 7:
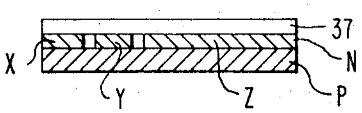
FIG. 7 is a front elevation of the scanning elements illustrated in FIG. 6.

The slit scanning mechanism illusated in FIGS. 2 and 3 is quite suitable for use in guided hand-propelled scanning mechanisms. However, where the guidance of the scanning mechanism is entirely by hand, the offset position of the slits 11 and 12 is susceptible to skew of the scanner mechanism, which can introduce sufficient error as to render operation marginal. In those instances a modification such as illustrated in FIG. 5 is particularly suitable since the scanning members are in alignment, thus mitigating the effects of skew. In this modification slits are not utilized. The scanning members are formed of etched silicon photo-diodes. A silicon photo-diode member is etched into three electrically independent elements X, Y and Z as illustrated in FIGS. 5, 6 and 7. Electrical contacts are made to the N material of the silicon photo-diode, and the P material is connected directly to ground and common to all of the elements of the members. A nonconductive opaque member 37 covers the contact areas on the N material and limits scanning area. The contacts from the X and Y areas are connected through a circuit 38 which provides an output equivalent to the output of the photosensitive elements associated with slits 11 in FIG. 2. Photosensitive areas Y and Z are connected via a circuit 39 which provide an output which is the equivalent of the output from the photosensitive element 17 associated with the slit 12 of FIG. 2.

Figure 8:
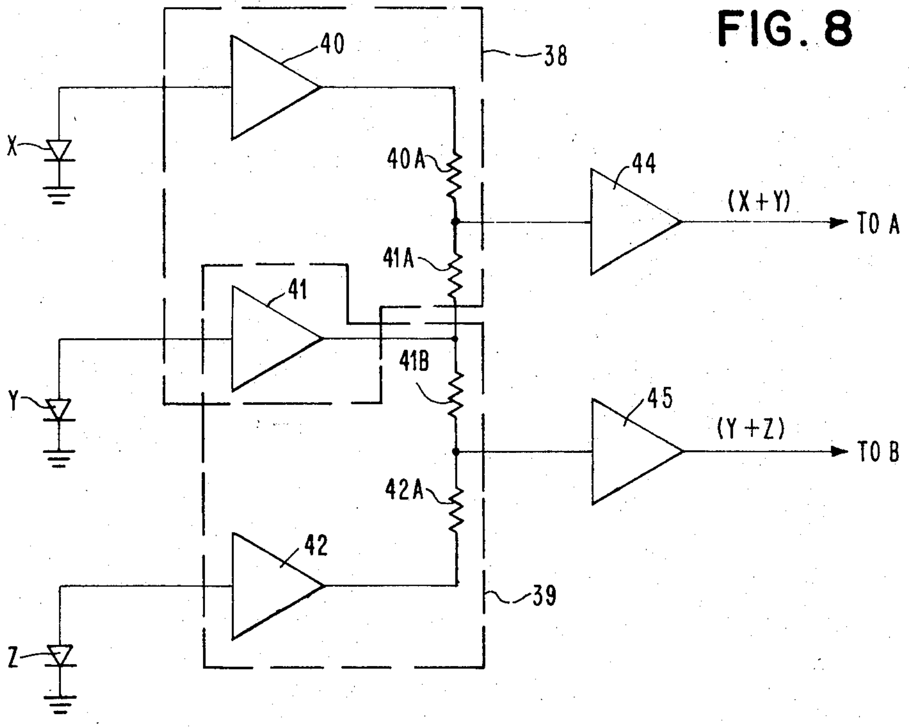
FIG. 8 is a schematic circuit diagram of the connections to the scanning element illustrated in FIGS. 5, 6 and 7.

The connections of the photo-diodes X, Y and Z and the circuits 38 and 39 are illustrated in FIG. 8. Photo-diode X is connected between ground and an amplifier 40. Photo-diode Y is connected between ground and an amplifier 41, and photo-diode Z is connected between ground and an amplifier 42. The outputs of amplifiers 40 and 41 are connected by resistors 40A and 41A respectively to the input of an amplifier 44, which provides an output suitable for application to the terminal A of the circuit illustrated in FIG. 4. The outputs of amplifiers 41 and 42 are connected by resistors 41B and 42A respectively to the input of an amplifier 45 which provides an output suitable for connection directly to the terminal B of FIG. 4. The output of amplifier 44 is the sum of the outputs of photo-diodes X and Y, and the output of amplifier 45 is the sum of the output of photo-diodes Y and Z. With the circuit connection described above, the photo-diodes X and Y perform the function of slit 11 of FIG. 2, and the photo-diodes Y and Z perform the function of slit 12 of FIG. 2. However, since the photo-diode Y is common to both elements of the circuit, the net effect is to superimpose the slits 11 and 12, thus, overcoming to a great extent the effects of skew of the scanning head.

Figure 9:
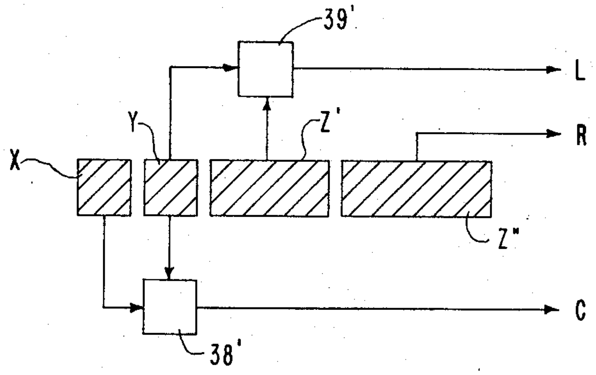
FIG. 9 is a schematic representation of yet another embodiment of the invention illustrated in FIG. 2.
Figure 10:
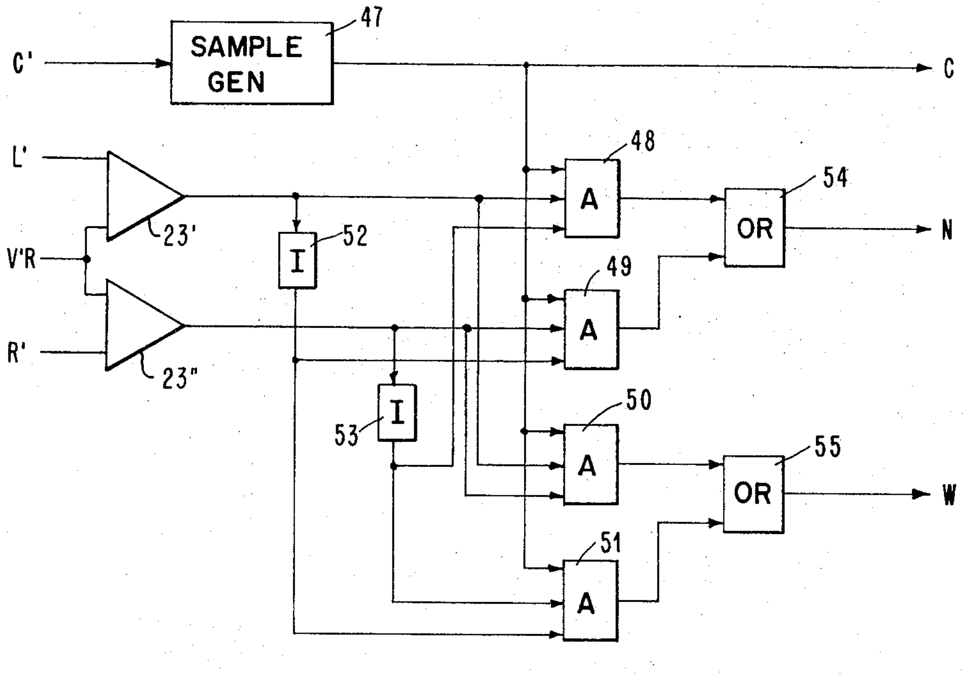
FIG. 10 is a schematic circuit diagram of the connections to the scanning element illustrated in FIG. 9, and, FIG. 11 is a schematic circuit diagram of a decoding circuit suitable for use with the novel scanning elements disclosed.

A modification of the structure illustrated in FIGS. 5 through 7 is shown in FIG. 9. Here the area Y plus Z has been divided into two equal portions, thus Y plus Z′ equals Z″ and the sum of Y plus Z′ plus Z″ equals Y plus Z of FIG. 5. The circuits 38′ and 39′ perform the same functions as the circuits 38 and 39 respectively in FIG. 5. With the arrangement illustrated in FIG. 9, the areas Y plus Z′ and Z″ will either be black or white or white and black respectively or both white or both black. A circuit for providing the outputs N and W with the arrangement illustrated in FIG. 9 is shown in FIG. 10. Here the outputs L, R and C of FIG. 9 are connected respectively to the terminals R′, L′ and C′.

Terminal C′ receives the clocking or sampling signal. This signal is connected via a sample or clock generating circuit 47 to one input of four three input AND gates 48, 49, 50 and 51. Sample generator 47 may be identical to the circuit illustrated in FIG. 4 which includes amplifier 20 and single shot circuits 24 and 25. Terminal L′ is connected via an amplifier 23′ to one of the inputs of an AND circuit 48 and to one of the inputs of an AND circuit 50. Amplifier 23′ is also connected via an inverter to one of the inputs of an AND circuit 49 and an AND circuit 51. Terminal R′ is connected via an amplifier 23″ to one of the inputs of AND circuits 49 and 50 and via an inverter 53 to one of the inputs of AND circuits 48 and 51. The outputs of AND circuits 48 and 49 are connected to an OR circuitt 54 which has an output when active indicating that the scanner resides at a clock or sample time, as indicated by the output C, on a narrow bar or space. The outputs of AND circuits 50 and 51 are connected to an OR gate 55, the output of which indicates that the scanner at the clock or sample time, as determined by the output C, resides on a wide black or white space or mark. AND gate 48 at sample time provides an output if the left half of the area viewed by the scanner is white and the right half if black. This indicates that the mark being examined is narrow. AND gate 49 provides an output at sample time if the right half of the scanner is over a white space and the left half of the scanner is over a black mark, thus, indicating that the black space is narrow. AND gate 50 provides an output when the left and right half of the scanner are both viewing a white area and AND gate 51 provides an output when both halves of the scanner are viewing a black area. In both instances the area viewed is considered wide as indicated by the output of OR circuit 55 under the conditions described above. Amplifiers 23′ and 23″ are also connected to a reference voltage source $V'_R$ and perform the same function as amplifier 23 of FIG. 4.

Figure 11:
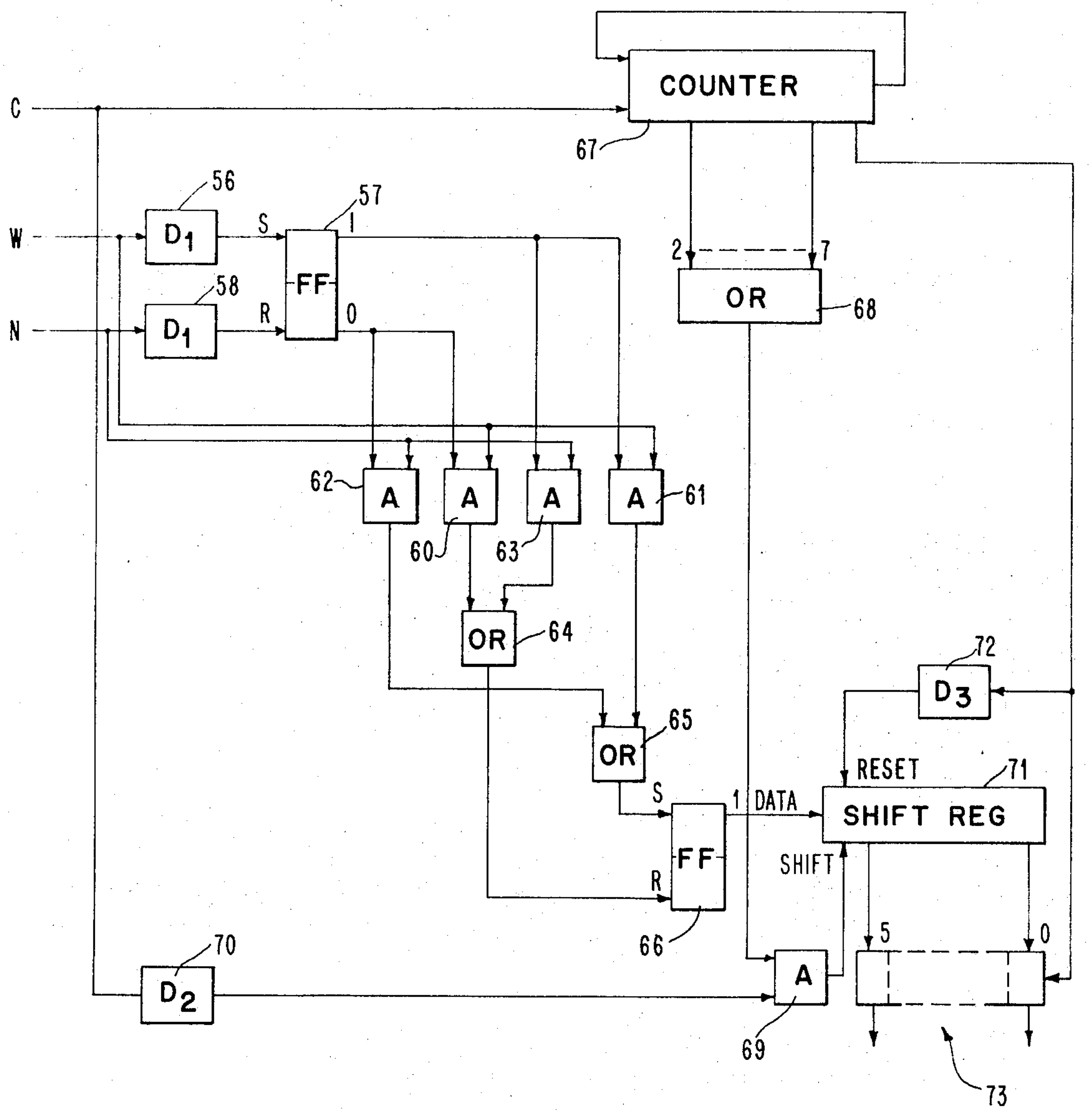

The circuit illustrated in FIG. 11 is useful with all of the modifications described for decoding the outputs from the scanner and the associated circuits described above. In response to the signals C, W and N, it provides an parallel binary coded output corresponding to the coded representations scanned by the scanner. The output W is applied via a delay circuit 56 to the set intput of a memory latch 57. The output N is applied via a delay circuit 58 to the reset input of latch 57, thus the latch 57 will reside in a state indicative of the size of a previously received signal. That is, it will be set if the previously scanned space or bar is wide and reset if the previously scanned space or bar is narrow. The W output is also connected to a pair of AND gates 60 and 61. The N output is connected to a pair of AND gates 62 and 63. AND gates 60 and 62 are connected to the zero output of memory latch 57 and AND gates 61 and 63 are connected to the one output of memory latch 57. The outputs of AND gates 60 and 63 indicate when active that the currently received signal on conductors W and N, as the case may be, differs from the previously received value. The output of AND gates 61 and 62 indicate that the currently received value of W and N, as the case may be, is the same as the previously received value. The output of gates 63 and 60 are connected via an OR circuit 64 to the reset input of a latch 66. The outputs of AND gates 62 and 65 are connected via an OR circuit 65 to the set input of latch 66. Thus, latch 66 indicates at all times the status of the comparison of the status of lines W and N with the status of latch 57.

The sampling signals on conductor C are connected to an eight position counter 67 which is arranged to recirculate upon a count of 8. Outputs 2 through 7 of counter 67 are connected via an OR circuit 68 to the enable input of an AND gate 69. Sampling pulses on conductor C are connected via a delay circuit 70 to the other input of AND gate 69. The display provided by delay circuit 70 is less than the delay provided by delay circuits 56 and 58. This is necessary to assure that the functions supported by AND gate 69 will occur prior to the resetting or setting of memory latch 57. The one output of latch 66 is connected to the input of a shift register 71 and the output of AND gate 69 is connected to the shift enable input of shift register 71. Each time the output of AND gate 69 is driven to an appropriate level by the sampling signal, the status of latch 66 is shifted into shift register 71. The status of latch 66 will be shifted six times for each cycle of counter 67, thus, providing in the shift register the 6 bits corresponding to the coded data being scanned. The eighth output position from the counter 67 is connected via a delay circuit 72 to the reset input of the shift register 71 and resets the register upon completion of the scanning and reading. The six positions of shift register 71 are connected via a gate 73 to an output bus. Gate 73 is also under control of the eighth position of counter 67, which upon obtaining the count of 8, makes the contents of shift register 71 available via gate 73 to a utilization device connected to the output bus. Shortly thereafter, as a result of the delay in circuit 72, the shift register is reset and prepared to accept the next scanned character.

While the invention has been particularly shown and described with reference to a preferred embodiment thereof, it will be understood by those skilled in the art that various changes in form and details may be made therein without departing from the spirit and scope of the invention.

What is claimed is:

1. A scanner suitable for the hand-propelled scanning of bar coded representations comprising:

a multielement scanning member in which, at least one scanning element is proportioned to view or examine an area substantially equal in width to the width of the largest bar coded representation and provide a signal corresponding to the instantaneous value of the light energy received from the coded representations viewed and at least one other scanning element is proportioned to simultaneously examine a substantially smaller area than that examined by said one element to provide a signal corresponding to the instantaneous value of the light energy received from the bar coded representations viewed;

first means responsive to the signal from said one scanning element for providing first signals when the received light energy is substantially midway between its maximum and minimum value and second signals when the received light energy is at substantially the maximum or minimum values;

second means responsive to the signal from said other scanning element for providing a pulsed output when the received light energy rises above or falls below a fixed reference level which corresponds to the mid-point between the maximum and minimum value of the light energy received from the scanned representations and which occurs when a transition from one reflective area to another of the bar codes is in substantial alignment with the center of said other scanning element; and means responsive to the outputs from said first and second means for providing sequential signals categorizing the sequential coded representations scanned.

2. A scanner as set forth in claim 1 in which said first means provides said first signal when the received light energy is between a lower and an upper reference level.

3. A scanner as set forth in claim 2 in which said one scanning element includes an elongated transparent scanning slit having an extent in the scanning direction substantially equal to the largest bar coded representation which is being scanned and said other scanning element includes a transparent scanning slit of substantially lesser extent than said one slit and arranged so that the center of the said other slit is in physical alignment with the leading edge of the said one slit in the scanning direction.

4. A scanner as set forth in claim 2 in which said one scanning element includes a first elongated photodiode and a second substantially shorter second photodiode electrically connected together, said first and second photo-diodes having a combined extent in the scanning direction substantially equal to the largest bar coded representation which is being scanned, and said other scanning element includes a third photo-diode substantially the same as said second photo-diode and means for electrically connecting the said second and third photo-diodes to additionally combine their outputs.

5. A scanner as set forth in claim 1 in which said one scanning element includes a first elongated photodiode having an extent in the scanning direction substantially equal to one-half of the largest bar coded representation which is being scanned, a second elongated photo-diode, and a third photo-diode of substantially lesser extent than said second electrically connected together and having a combined extent in the scanning direction substantially equal to the said first photodiode; and said other scanning element includes a fourth photo-diode substantially the same as said third photo-diode and means for electrically connecting the third and fourth photo-diodes to additionally combine their outputs.

* * * * *